US012681271B2

(12) United States Patent　　　　(10) Patent No.:　US 12,681,271 B2
Chen et al.　　　　　　　　　　　　(45) Date of Patent:　　　Jul. 14, 2026

(54) LENS ASSEMBLY

(71) Applicants: Sintai Optical (Shenzhen) Co., Ltd., ShenZhen City (CN); Asia Optical Co., Inc., Taichung (TW)

(72) Inventors: Bo-Yan Chen, Taichung (TW); Hsi-Ling Chang, Taichung (TW)

(73) Assignees: SINTAI OPTICAL (SHENZHEN) CO., LTD., Shenzhen City (CN); ASIA OPTICAL CO., INC., Taichung (TW)

( * ) Notice: Subject to any disclaimer, the term of this patent is extended or adjusted under 35 U.S.C. 154(b) by 229 days.

(21) Appl. No.: 18/770,827

(22) Filed: Jul. 12, 2024

(65) Prior Publication Data

US 2025/0147281 A1　　　May 8, 2025

(30) Foreign Application Priority Data

Nov. 6, 2023　(TW) ................................. 112142659

(51) Int. Cl.
　　*G02B 13/00*　　　(2006.01)
　　*G02B 9/14*　　　(2006.01)
(52) U.S. Cl.
　　CPC ........... *G02B 13/0035* (2013.01); *G02B 9/14* (2013.01); *G02B 13/0065* (2013.01)

(58) Field of Classification Search
　　CPC ... G02B 13/0035; G02B 9/14; G02B 13/0065
　　USPC ........................................................ 359/785
　　See application file for complete search history.

(56) References Cited

U.S. PATENT DOCUMENTS 11,852,896　B2　12/2023　Huh et al.
2021/0318522　A1　10/2021　Zhang et al.
2023/0116701　A1　4/2023　Huh et al.

FOREIGN PATENT DOCUMENTS

TW　　　202223483　A　　6/2022
TW　　　M646542　U　　10/2023

*Primary Examiner* — Bumsuk Won
*Assistant Examiner* — Grant A Gagnon
(74) *Attorney, Agent, or Firm* — McClure, Qualey & Rodack, LLP

(57)　　　　　　ABSTRACT

A lens assembly includes a first lens, a second lens, a third lens, a first reflective element, and a second reflective element. The first lens is with positive refractive power. The first reflective element includes a first surface, a second surface, and a third surface, wherein the first surface and the third lens are opposite to each other. The second reflective element includes a fourth surface, a fifth surface, and a sixth surface, wherein the fourth surface and the third surface are opposite to each other. The first lens, the second lens, the third lens, and the first reflective element are arranged in order from an object side along a first axis. The first reflective element and the second reflective element are arranged in order along a second axis. The second reflective element and an image plane are arranged in order along a third axis.

20 Claims, 9 Drawing Sheets

Field Curvature

Distortion

Distortion

LENS ASSEMBLY

BACKGROUND OF THE INVENTION

Field of the Invention

The invention relates to a lens assembly.

Description of the Related Art

In order to achieve high-resolution imaging quality, conventional lens assembly often need to use more lenses combinations to effectively eliminate aberrations. As a result, the total length of the lens assembly is too long and the volume is too large, which cannot meet the requirements of slim and lightweight of portable device. Therefore, the lens assembly needs a new structure in order to meet the requirements of high resolution, miniaturization, and small size at the same time.

BRIEF SUMMARY OF THE INVENTION

The invention provides a lens assembly to solve the above problems. The lens assembly of the invention is provided with characteristics of a decreased total lens length, a decreased volume, an increased resolution, and still has a good optical performance. Specifically, the lens assembly of the present invention has the following benefits: setting reflective element to reflect the incent light several times inside the reflective element, enabling to set a long focus lens with a longer effective focal length in the limited space and decreased total lens length and volume for the lens assembly, and meet the requirements of slim and lightweight of portable device.

The lens assembly in accordance with an exemplary embodiment of the invention includes a first lens, a second lens, a third lens, a first reflective element, and a second reflective element. The first lens is with positive refractive power. The second lens is with refractive power. The third lens is with refractive power. The first reflective element includes a first surface, a second surface, and a third surface, the first surface and the third lens are opposed to each other. The second reflective element includes a fourth surface, a fifth surface, and a sixth surface, the fourth surface and the third surface opposed to each other. The first lens, the second lens, the third lens and the first reflective element are arranged in order from an object side along a first axis. The first reflective element and the second reflective element are arranged in order along a second axis. The second reflective element and an image plane are arranged in order along a third axis. The first axis and the second axis intersect perpendicularly at a point, the second axis and the third axis do not intersect perpendicularly at another point, and the extension lines of the first axis and the third axis do not perpendicularly intersect at yet another point. The first lens includes a concave surface facing the first surface. The lens assembly satisfies at least one of the following conditions: $34 \text{ mm}^2 < f \times (T1+T2+T3) < 44 \text{ mm}^2$; $9 < TTL/(T1+T2+T3) < 10$; $9.5 < f1/T1 < 39.5$; $1.2 < (f+TTL)/f1 < 4.1$; $55 \text{ mm}^2 < D1IMG \times f1 < 158 \text{ mm}^2$; $17 < f/T1 < 30$; $44 < (R11+R12)/T1 < 63$; wherein f is an effective focal length of the lens assembly, f1 is an effective focal length of the first lens, T1 is an interval from an object side surface of the first lens to an image side surface of the first lens along the first axis, T2 is an interval from an object side surface of the second lens to an image side surface of the second lens along the first axis, T3 is an interval from an object side surface of the third lens to an image side surface of the third lens along the first axis, TTL is an interval from the object side surface of the first lens to the image plane along the first axis, the second axis and the third axis respectively, D1IMG is an optical effective diameter of the image side surface of the first lens, R11 is a radius of curvature of the object side surface of the first lens, and R12 is a radius of curvature of the image side surface of the first lens.

In another exemplary embodiment, the first lens is a meniscus lens and further includes a convex surface facing the object side.

In yet another exemplary embodiment, the second lens is a meniscus lens, and includes a convex surface facing the object side and a concave surface facing the first surface.

In another exemplary embodiment, the third lens includes a concave surface facing the first surface.

In yet another exemplary embodiment, the second lens is with positive refractive power; and the third lens is a meniscus lens.

In another exemplary embodiment, the third lens is with negative refractive power and further includes a convex surface facing the object side.

In yet another exemplary embodiment, the second lens is with negative refractive power; and the third lens is with positive refractive power.

In another exemplary embodiment, the third lens is a meniscus lens and further includes a convex surface facing the object side.

In yet another exemplary embodiment, the third lens is a biconcave lens with negative refractive power and further includes another concave surface facing the object side.

In another exemplary embodiment, the lens assembly satisfies at least one of the following conditions: $300 \text{ mm}^2 < f1 \times R12 < 800 \text{ mm}^2$; $5 \text{ mm}^2 < f1 \times T2 < 24 \text{ mm}^2$; $24.5 < TTL/T2 < 35.5$; $37 \text{ mm}^2 < DisL1toP \times f1 < 119 \text{ mm}^2$; wherein f1 is the effective focal length of the first lens, T2 is the interval from the object side surface of the second lens to the image side surface of the second lens along the first axis, TTL is the interval from the object side surface of the first lens to the image plane along the first axis, the second axis and the third axis respectively, DisL1toP is an interval from the object side surface of the first lens to the first surface of the first reflective element along the first axis, and R12 is the radius of curvature of the image side surface of the first lens.

In yet another exemplary embodiment, both sides of the first surface are respectively connected to one side of the second surface and one side of the third surface, and the other side of the second surface is connected to the other side of the third surface.

In another exemplary embodiment, one side of the fifth surface is connected to one side of the fourth surface, the other side of the fifth surface is connected to one side of the sixth surface, and the sixth surface faces the image plane.

In yet another exemplary embodiment, a light from the object side enters the first reflective element from the first surface and guide to the second surface, and the light be reflected at least two times inside the first reflective element, then exit the first reflective element form the third surface.

In another exemplary embodiment, the light from the first reflective element is incident in the second reflective element from the fourth surface, and then emitted to the fifth surface, the light is reflected at least once inside the second reflective element, and finally emitted from the sixth surface of the second reflective element.

In yet another exemplary embodiment, the lens assembly further includes a stop disposed between the object side and the first lens, wherein the first reflective element and the second reflective element are cemented.

In another exemplary embodiment, the lens assembly further includes a groove disposed on the first reflective element or the second reflective element.

In yet another exemplary embodiment, the groove is disposed on the other side opposite to the fifth surface, and the recessed area of the groove faces away from the fifth surface.

In another exemplary embodiment, the lens assembly satisfies at least one of following conditions: $-35 \leq Vd1-VdP1 \leq 10$; $-55 \leq Vd2-VdP2 \leq 0$; wherein Vd1 is an Abbe number of the first lens, Vd2 is an Abbe number of the second lens, VdP1 is an Abbe number of the first reflective element, and VdP2 is an Abbe number of the second reflective element.

In yet another exemplary embodiment, the lens assembly satisfies at least one of following conditions: $0$ mm$\leq f1+f2 \leq 200$ mm; $0$ mm$\leq f2+f3 \leq 180$ mm; $-5 \leq f1/f3 \leq 4$; wherein f1 is an effective focal length of the first lens, f2 is an effective focal length of the second lens, and f3 is an effective focal length of the third lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
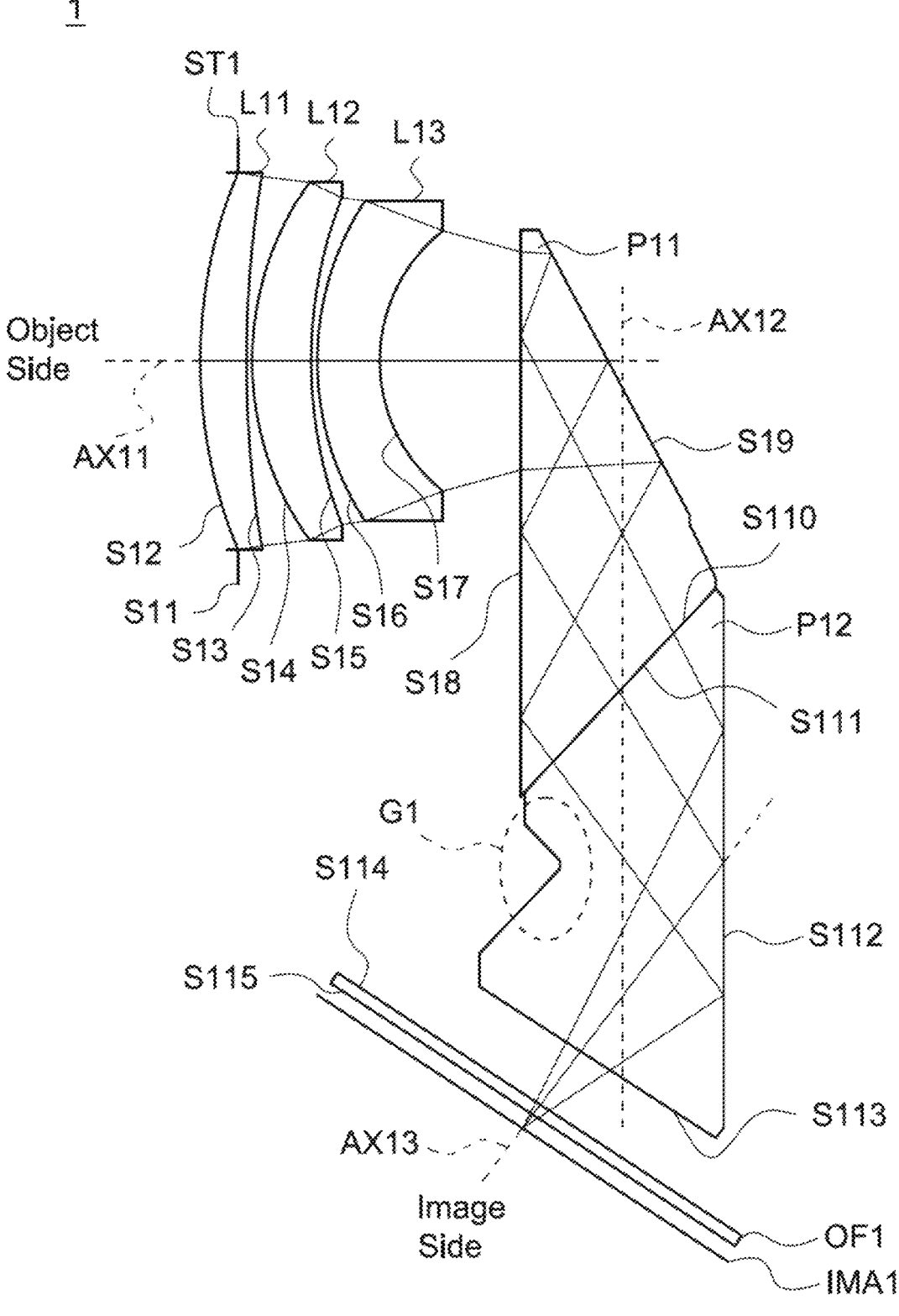
FIG. 1 is a lens layout and optical path diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a first lens, a second lens, a third lens, a first reflective element, and a second reflective element. The first lens is with positive refractive power. The second lens is with refractive power. The third lens is with refractive power. The first reflective element includes a first surface, a second surface, and a third surface, the first surface and the third lens are opposed to each other, both sides of the first surface are respectively connected to one side of the second surface and one side of the third surface, and the other side of the second surface is connected to the other side of the third surface. The second reflective element includes a fourth surface, a fifth surface, and a sixth surface, the fourth surface and the third surface opposed to each other, one side of the fifth surface is connected to one side of the fourth surface, the other side of the fifth surface is connected to one side of the sixth surface, and the sixth surface faces an image plane. The first lens, the second lens, the third lens and the first reflective element are arranged in order from an object side along a first axis. The first reflective element and the second reflective element are arranged in order along a second axis. The second reflective element and the image plane are arranged in order along a third axis. The first lens includes a concave surface facing the first surface. A light from the object side enters the first reflective element from the first surface and guide to the second surface, and the light be reflected at least two times inside the first reflective element, then exit the first reflective element form the third surface. The light from the first reflective element is incident in the second reflective element from the fourth surface, and then emitted to the fifth surface. The light is reflected at least once inside the second reflective element, and finally emitted from the sixth surface of the second reflective element. The lens assembly satisfies at least one of the following conditions: $34$ mm$^2 < fx(T1+T2+T3) < 44$ mm$^2$; $5$ mm$^2 < f1xT2 < 24$ mm$^2$; $9 < TTL/(T1+T2+T3) < 10$; $24.5 < TTL/T2 < 35.5$; $9.5 < f1/T1 < 39.5$; $1.2 < (f+TTL)/f1 < 4.1$; $55$ mm$^2 < D1IMGxf1 < 158$ mm$^2$; $37$ mm$^2 < DisL1toPxf1 < 119$ mm$^2$; wherein f is an effective focal length of the lens assembly, f1 is an effective focal length of the first lens, T1 is an interval from an object side surface of the first lens to an image side surface of the first lens along the first axis, T2 is an interval from an object side surface of the second lens to an image side surface of the second lens along the first axis, T3 is an interval from an object side surface of the third lens to an image side surface of the third lens along the first axis, TTL is an interval from the object side surface of the first lens to the image plane along the first axis, the second axis and the third axis respectively, D1IMG is an optical effective diameter of the image side surface of the first lens, and DisL1toP is an interval from the object side surface of the first lens to the first surface of the first reflective element along the first axis. The basic function of the lens assembly of the present invention can be achieved when the lens assembly of the present invention satisfies the above features and conditions, and without require other additional features or conditions.

Referring to Table 1, Table 2, Table 4, Table 5, Table 7, and Table 8, wherein Table 1, Table 4, and Table 7 show optical specification in accordance with a first, second, and third embodiments of the invention, respectively, and Table 2, Table 5, and Table 8 show aspheric coefficients of each aspheric lens in Table 1, Table 4, and Table 7, respectively.

Figure 5:
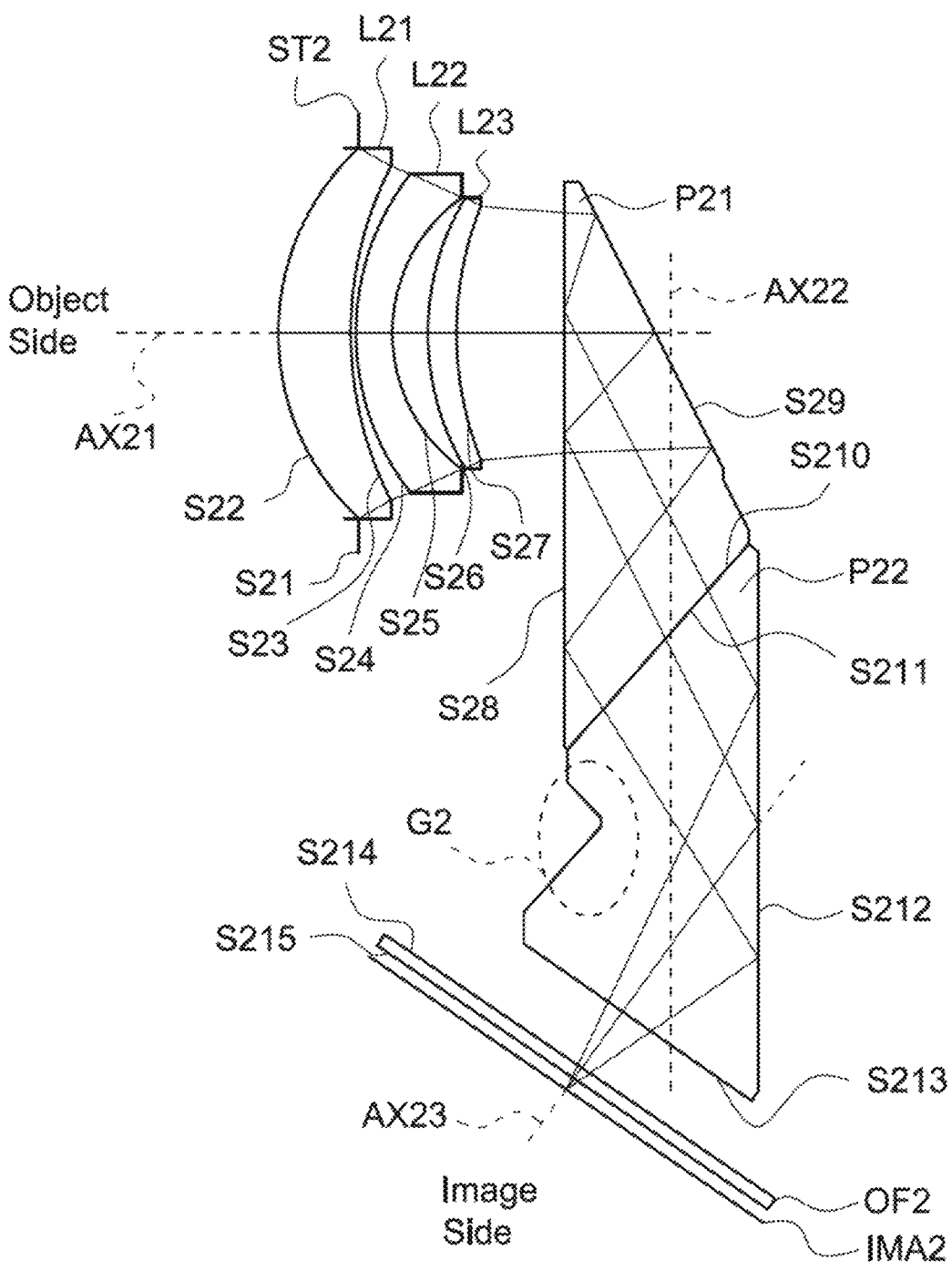
FIG. 5 is a lens layout and optical path diagram of a lens assembly in accordance with a second embodiment of the invention.
Figure 9:
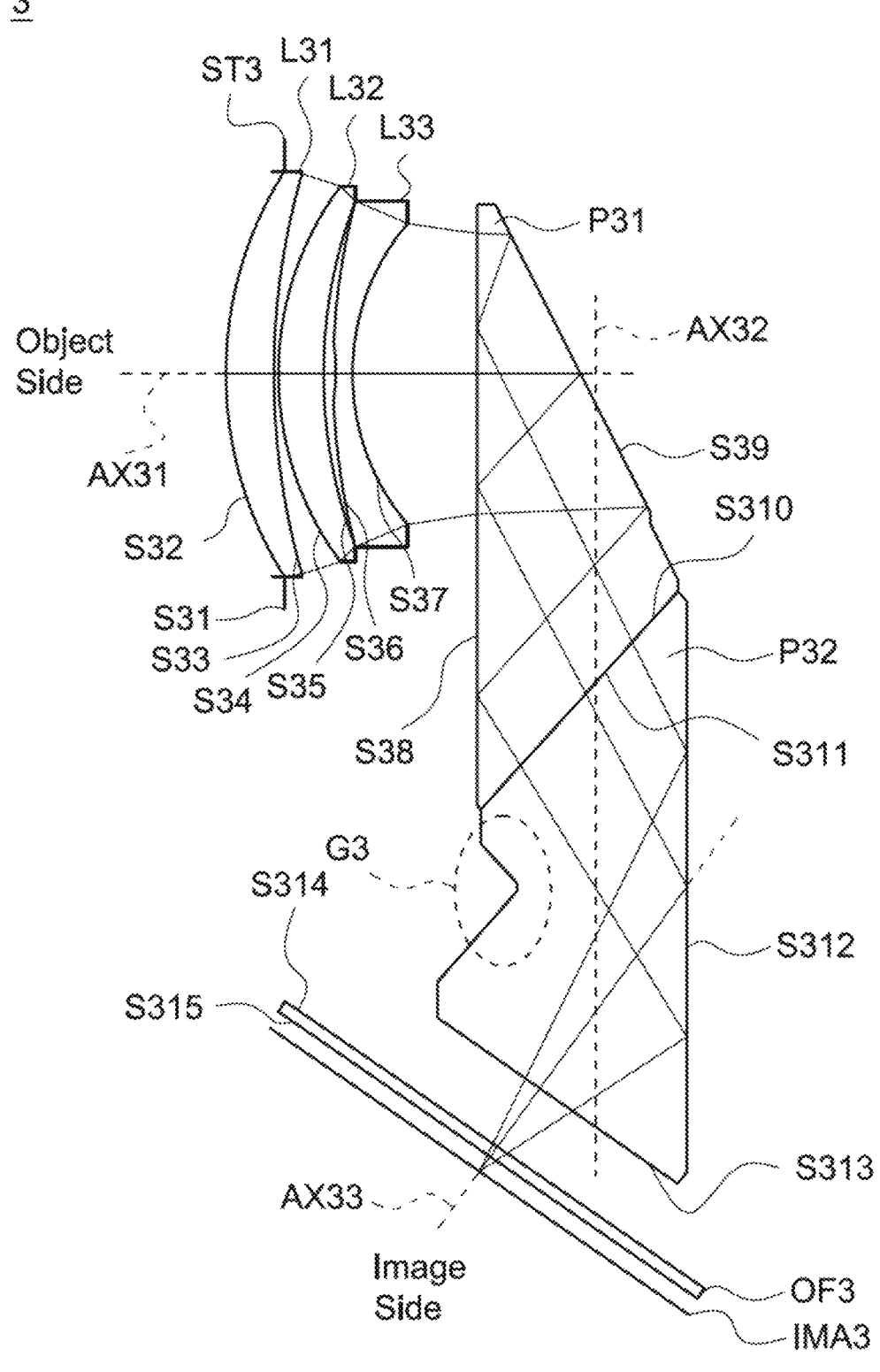
FIG. 9 is a lens layout and optical path diagram of a lens assembly in accordance with a third embodiment of the invention.

FIG. 1, FIG. 5, and FIG. 9 are lens layout and optical path diagrams of a lens assembly in accordance with a first, second, and third embodiments of the invention, respectively. The first lenses L11, L21, L31 are meniscus lenses with positive refractive power, wherein the object side surfaces S12, S22, S32 are convex surfaces, the image side surfaces S13, S23, S33 are concave surfaces, and both of the object side surfaces S12, S22, S32 and image side surfaces S13, S23, S33 are aspheric surfaces. The second lenses L12, L22, L32 are meniscus lenses with refractive power, wherein the object side surfaces S14, S24, S34 are convex surfaces, the image side surfaces S15, S25, S35 are concave surfaces, and both of the object side surfaces S14, S24, S34 and image side surfaces S15, S25, S35 are aspheric surfaces. The third lenses L13, L23, L33 are with refractive power, wherein the image side surfaces S17, S27, S37 are concave surfaces and both of the object side surfaces S16, S26, S36 and image side surfaces S17, S27, S37 are aspheric surfaces.

The first reflective elements P11, P21, P31 are prisms and made of glass or plastic material, wherein the first surfaces S18, S28, S38 are plane surfaces, the second surfaces S19, S29, S39 are plane surfaces, and the third surfaces S110, S210, S310 are plane surfaces. The second reflective elements P12, P22, P32 are prisms and made of glass or plastic material, wherein the fourth surfaces S111, S211, S311 are plane surfaces, the fifth surfaces S112, S212, S312 are plane surfaces, and the sixth surfaces S113, S213, S313 are plane surfaces. With the configuration of the first reflective element and the second reflective element, the total length of the lens assembly can be shortened, thereby decreasing the volume of the lens assembly and avoiding excessively occupying the limited space of the device equipped with the lens assembly.

In addition, the lens assemblies 1, 2, 3 satisfy at least one of the following conditions (1)-(16):

$$34 \text{ mm}^2 < f \times (T1 + T2 + T3) < 44 \text{ mm}^2; \quad (1)$$

$$5 \text{ mm}^2 < f1 \times T2 < 24 \text{ mm}^2; \quad (2)$$

$$9 < TTL / (T1 + T2 + T3) < 10; \quad (3)$$

$$24.5 < TTL / T2 < 35.5; \quad (4)$$

$$9.5 < f1 / T1 < 39.5; \quad (5)$$

$$1.2 < (f + TTL) / f1 < 4.1; \quad (6)$$

$$55 \text{ mm}^2 < D1IMG \times f1 < 158 \text{ mm}^2; \quad (7)$$

$$37 \text{ mm}^2 < DisL1toP \times f1 < 119 \text{ mm}^2; \quad (8)$$

$$-35 \leq Vd1 - VdP1 \leq 10; \quad (9)$$

$$-55 \leq Vd2 - VdP2 \leq 0; \quad (10)$$

$$0 \text{ mm} \leq f1 + f2 \leq 200 \text{ mm}; \quad (11)$$

$$0 \text{ mm} \leq f2 + f3 \leq 180 \text{ mm}; \quad (12)$$

$$-5 \leq f1 / f3 \leq 4; \quad (13)$$

$$300 \text{ mm}^2 < f1 \times R12 < 800 \text{ mm}^2; \quad (14)$$

$$17 < f / T1 < 30; \quad (15)$$

$$44 < (R11 + R12) / T1 < 63; \quad (16)$$

wherein f is an effective focal length of the lens assemblies 1, 2, 3 for the first to third embodiments, f1 is an effective focal length of the first lenses L11, L21, L31 for the first to third embodiments, f2 is an effective focal length of the second lenses L12, L22, L32 for the first to third embodiments, f3 is an effective focal length of the third lenses L13, L23, L33 for the first to third embodiments, T1 is an interval from the object side surfaces S12, S22, S32 of the first lenses L11, L21, L31 to the image side surfaces S13, S23, S33 of the first lenses L11, L21, L31 along the first axes AX11, AX21, AX31 for the first to third embodiments, T2 is an interval from the object side surfaces S14, S24, S34 of the second lenses L12, L22, L32 to the image side surfaces S15, S25, S35 of the second lenses L12, L22, L32 along the first axes AX11, AX21, AX31 for the first to third embodiments, T3 is an interval from the object side surfaces S16, S26, S36 of the third lenses L13, L23, L33 to the image side surfaces S17, S27, S37 of the third lenses L13, L23, L33 along the first axes AX11, AX21, AX31 for the first to third embodiments, TTL is an interval from the object side surfaces S12, S22, S32 of the first lenses L11, L21, L31 to the image planes IMA1, IMA2, IMA3 along the first axes AX11, AX21, AX31, the second axes AX12, AX22, AX32, and the third axes AX13, AX23, AX33 respectively for the first to third embodiments, that is, a total geometrical optical-path length from the object side surfaces S12, S22, S32 of the first lenses L11, L21, L31 to the image planes IMA1, IMA2, IMA3 along the first axes AX11, AX21, AX31, the second axes AX12, AX22, AX32, and the third axes AX13, AX23, AX33 respectively for the first to third embodiments, D1IMG is an optical effective diameter of the image side surface S13, S23, S33 of the first lens L11, L21, L31 for the first to third embodiments, DisL1toP is an interval from the object side surface S12, S22, S32 of the first lens L11, L21, L31 to the first surface S18, S28, S38 of the first reflective element P11, P21, P31 along the first axis AX11, AX21, A31 for the first to third embodiments, R11 is a radius of curvature of the object side surfaces S12, S22, S32 of the first lenses L11, L21, L31 for the first to third embodiments, R12 is a radius of curvature of the image side surfaces S13, S23, S33 of the first lenses L11, L21, L31 for the first to third embodiments, Vd1 is an Abbe number of the first lenses L11, L21, L31 for the first to third embodiments, Vd2 is an Abbe number of the second lenses L12, L22, L32 for the first to third embodiments, VdP1 is an Abbe number of the first reflective element P11, P21, P31 for the first to third embodiments, and VdP2 is an Abbe number of the second reflective element P12, P22, P32 for the first to third embodiments. With the lens assemblies 1, 2, 3 satisfying at least one of the above conditions (1)-(16), it is a preferred embodiment of the present invention, and the total lens length can be effectively shortened, the volume can be effectively decreased, the resolution can be effectively increased, and the aberration can be effectively corrected.

When the condition (9): $-35 \leq Vd1 - VdP1 \leq 10$; condition (10): $-55 \leq Vd2 - VdP2 \leq 0$; condition (11): $0 \text{ mm} \leq f1 + f2 \leq 200$ mm; condition (12): $0 \text{ mm} \leq f2 + f3 \leq 180$ mm; condition (13): $-5 \leq f1 / f3 \leq 4$ are satisfied, lens materials can be matched with each other to effectively correct chromatic aberrations to improve imaging quality. When the condition (1): $34 \text{ mm}^2 < f \times (T1 + T2 + T3) < 44 \text{ mm}^2$; condition (3): $9 < TTL / (T1 + T2 + T3) < 10$ are satisfied, it can optimize the lenses distribution of the lens assembly to achieve miniaturization. When the condition (2): $5 \text{ mm}^2 < f1 \times T2 < 24 \text{ mm}^2$; condition (5): $9.5 < f1 / T1 < 39.5$; condition (15): $17 < f / T1 < 30$ are satisfied, the coaxiality of the optical effective area can be improved. When the condition (4): $24.5 < TTL / T2 < 35.5$ is satisfied, it can effectively avoid poor space utilization caused by overcrowding or loose lenses arrangement, which is beneficial to the space utilization rate in the optical system. When the condition (6): $1.2 < (f + TTL) / f1 < 4.1$ is satisfied, it can effectively ensure that the lens assembly achieves a good balance between miniaturization and manufacturability. When the condition (7): $55 \text{ mm}^2 < D1IMG \times f1 < 158 \text{ mm}^2$ is satisfied, the manufacturing yield in mass production stage can be effectively improved. When the condition (8): $37 \text{ mm}^2 < DisL1toP \times f1 < 119 \text{ mm}^2$ is satisfied, the lenses distribution between the object side and the first reflective element can be adjusted to ensure sufficient refractive power and further reduce the total length and size of the lens assembly. When the condition (14): 300 mm$^2$<f1× R12<800 mm$^2$ is satisfied, the lens shape and refractive power can be adjusted to improve image quality at the center of the image. When the condition (16): 44<(R11+R12)/ T1<63 is satisfied, the lens shape and thickness can be effectively configured to increase the field of view.

A detailed description of a lens assembly in accordance with a first embodiment of the invention is as follows. Referring to FIG. 1, the lens assembly 1 includes a stop ST1, a first lens L11, a second lens L12, a third lens L13, a first reflective element P11, a second reflective element P12, and an optical filter OF1. The stop ST1, the first lens L11, the second lens L12, the third lens L13 and the first reflective element P11 are arranged in order from an object side along a first axis AX11. The first reflective element P11 and the second reflective element P12 are arranged in order along a second axis AX12. An image plan IMA1, the optical filter OF1 and the second reflective element P12 are arranged in order from an image side along a third axis AX13. The first axis AX11 and the second axis AX12 intersect perpendicularly at a point, the second axis AX12 and the third axis AX13 do not intersect perpendicularly at another point, and the extension lines of the first axis AX11 and the third axis AX13 do not perpendicularly intersect at yet another point. The first reflective element P11 includes a first surface S18, a second surface S19, and a third surface S110, the first surface S18 and the third lens L13 are opposed to each other, both sides of the first surface S18 are respectively connected to one side of the second surface S19 and one side of the third surface S110, and the other side of the second surface S19 is connected to the other side of the third surface S110. The second reflective element P12 includes a fourth surface S111, a fifth surface S112, a sixth surface S113, and a groove G1, the fourth surface S111 and the third surface S110 opposed to each other, one side of the fifth surface S112 is connected to one side of the fourth surface S111, the other side of the fifth surface S112 is connected to one side of the sixth surface S113, and the sixth surface S113 faces an image plane IMA1. The groove G1 is disposed on the other side opposite to the fifth surface S112, and the recessed area of the groove G1 faces away from the fifth surface S112. The third surface S110 of the first reflective element P11 and the fourth surface S111 of the second reflective element P12 are cemented. However, the invention is not limited thereto, the groove G1 can be disposed at any place on the first reflective element P11 or the second reflective element P12 as required to achieve the effect of eliminating stray light and preventing flare. In addition, the third surface S110 of the first reflective element P11 and the fourth surface S111 of the second reflective element P12 can be not glued together but have an air gap. In operation, a light from the object side passing through the stop ST1, the first lens L11, the second lens L12 and the third lens L13, and then entering the first reflective element P11 from the first surface S18, then guided to the second surface S19, reflected by the second surface S19 and guided to the first surface S18, then reflected by the first surface S18 and guided to the third surface S110, then exiting the first reflective element P11 from the third surface S110, and then enters the second reflective element P12 from the fourth surface S111, and then emits to the fifth surface S112, and is reflected by the fifth surface S112 to the sixth surface S113, finally exiting the second reflective element P12 from the sixth surface S113. The light is reflected two times inside the first reflective element P11, and reflected one time inside the second reflective element P12, finally imaged on an image plane IMA1. The above mentioned groove G1 can effectively eliminate ghosts, flare and stray light. According to the foregoing, wherein: the second lens L12 is with positive refractive power; the third lens L13 is meniscus lens with negative refractive power, wherein the object side surface S16 is a convex surface; and both of the object side surface S114 and image side surface S115 of the optical filter OF1 are plane surfaces. With the above design of the lenses, stop ST1, first reflective element P11, second reflective element P12, and at least one of the conditions (1)-(16) satisfied, the lens assembly 1 can have an effective shortened total lens length, an effective decreased volume, an effective increased resolution, and an effective corrected aberration.

Table 1 shows the optical specification of the lens assembly 1 in FIG. 1.

TABLE 1

Effective Focal Length = 17.5 mm F-number = 2.8
Total Lens Length = 22.11 mm Field of View = 26.1 degrees

| Surface Number | Radius of Curvature (mm) | Thickness (mm) | Nd | Vd | Effective Focal Length (mm) | Remark |
|---|---|---|---|---|---|---|
| S11 | ∞ | −0.542 | | | | ST1 |
| S12 | 9.58 | 0.67 | 1.53 | 56.1 | 25.733 | L11 |
| S13 | 30.47 | 0.05 | | | | |
| S14 | 4.99 | 0.88 | 1.79 | 45.5 | 14.544 | L12 |
| S15 | 8.04 | 0.08 | | | | |
| S16 | 4.78 | 0.88 | 1.67 | 19.20 | −13.66 | L13 |
| S17 | 2.92 | 1.85 | | | | |
| S18 | ∞ | 7.50 | 1.69 | 55.5 | | P11 |
| S110 | ∞ | 0.00 | | | | |
| S111 | ∞ | 8.00 | 1.69 | 55.5 | | P12 |
| S113 | ∞ | 0.30 | | | | |
| S114 | ∞ | 0.21 | 1.52 | 61.2 | | OF1 |
| S115 | ∞ | 1.70 | | | | |

The aspheric surface sag z of each aspheric lens in table 1 can be calculated by the following formula:

$$z = ch^2/\left\{1 + \left[1(k+1)c^2h^2\right]^{1/2}\right\} + Ah^2 + Bh^4 + Ch^6 + Dh^8 + Eh^{10} + Fh^{12} + Gh^{14}$$

where c is curvature, h is the vertical distance from the lens surface to the axis, k is conic constant and A, B, C, D, E, F and G are aspheric coefficients.

In the first embodiment, the conic constant k and the aspheric coefficients A, B, C, D, E, F, G of each aspheric lens are shown in Table 2.

TABLE 2

| Surface Number | k | A E | B F | C G | D |
|---|---|---|---|---|---|
| S12 | 1.12E+00 | 2.88E−04 −3.86E−10 | 2.47E−04 −1.03E−10 | −2.02E−05 0.00E+00 | −9.30E−08 |
| S13 | 9.15E+00 | 1.64E−03 1.97E−08 | −3.40E−05 2.04E−09 | 1.04E−05 3.67E−11 | −2.28E−06 |
| S14 | 5.85E−01 | −4.68E−04 −4.67E−07 | −3.28E−04 −4.46E−08 | −1.64E−05 3.81E−09 | 9.43E−06 |
| S15 | −2.37E+01 | 3.81E−03 −9.65E−07 | −1.45E−03 2.36E−07 | 3.04E−04 −1.01E−08 | −2.13E−05 |
| S16 | 9.19E−02 | −1.24E−03 −7.52E−06 | −5.66E−04 1.04E−06 | 1.62E−04 −4.75E−08 | 4.19E−06 |
| S17 | −9.57E−03 | −6.54E−05 1.26E−05 | −4.89E−04 −1.45E−06 | 1.08E−04 5.73E−08 | −6.21E−05 |

Table 3 shows the parameters and condition values for conditions (1)-(16) in accordance with the first embodiment of the invention. It can be seen from Table 3 that the lens assembly 1 of the first embodiment satisfies the conditions (1)-(16).

TABLE 3

| | |
|---|---|
| D1IMG | 6.02 mm |
| f × (T1 + T2 + T3) | 42.44 mm² |
| TTL/T2 | 25.15 |
| D1IMG × f1 | 154.91 mm² |
| f/T1 | 26.21 |
| Vd2 − VdP2 | −10 |
| DisL1toP | 4.4 mm |
| f1 × T2 | 22.62 mm² |
| f1/T1 | 38.54 |
| DisL1toP × f1 | 113.23 mm² |
| (R11 + R12)/T1 | 59.99 |
| f1 + f2 | 40.28 mm |
| f1/f3 | −1.88 |
| TTL/(T1 + T2 + T3) | 9.12 |
| (f + TTL)/f1 | 1.54 |
| f1 × R12 | 784.10 mm² |
| Vd1 − VdP1 | 0.6 |
| f2 + f3 | 0.88 mm |

The above mentioned lens assembly 1 can also be modified to only satisfies any one of conditions (1)-(16), and satisfies the first lens is with positive refractive power, the second lens is with refractive power, the third lens is with refractive power, the first lens includes a concave surface facing the image side, the first reflective element includes a first surface, a second surface and a third surface, and the second reflective element includes a fourth surface, a fifth surface and a sixth surface, without other additional conditions and features, the basic operation of the lens assembly 1 of the present invention can be achieved.

Figure 2:
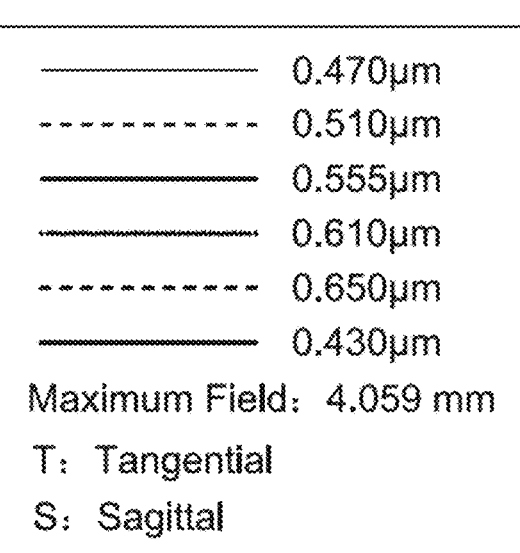
FIG. 2 depict a field curvature diagram of the lens assembly in accordance with the first embodiment of the invention.
Figure 2:
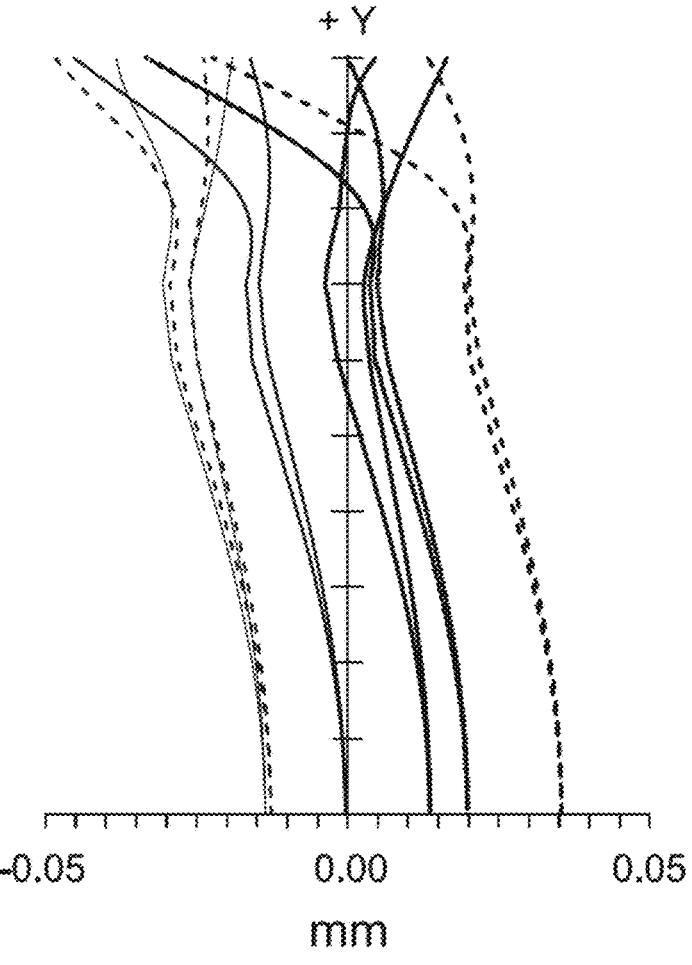
Figure 3:
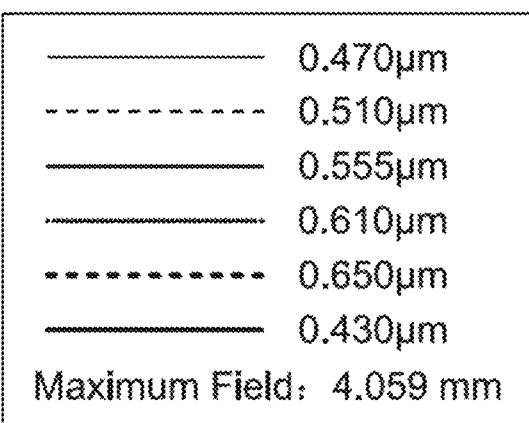
FIG. 3 depict a distortion diagram of the lens assembly in accordance with the first embodiment of the invention.
Figure 3:
Figure 3:
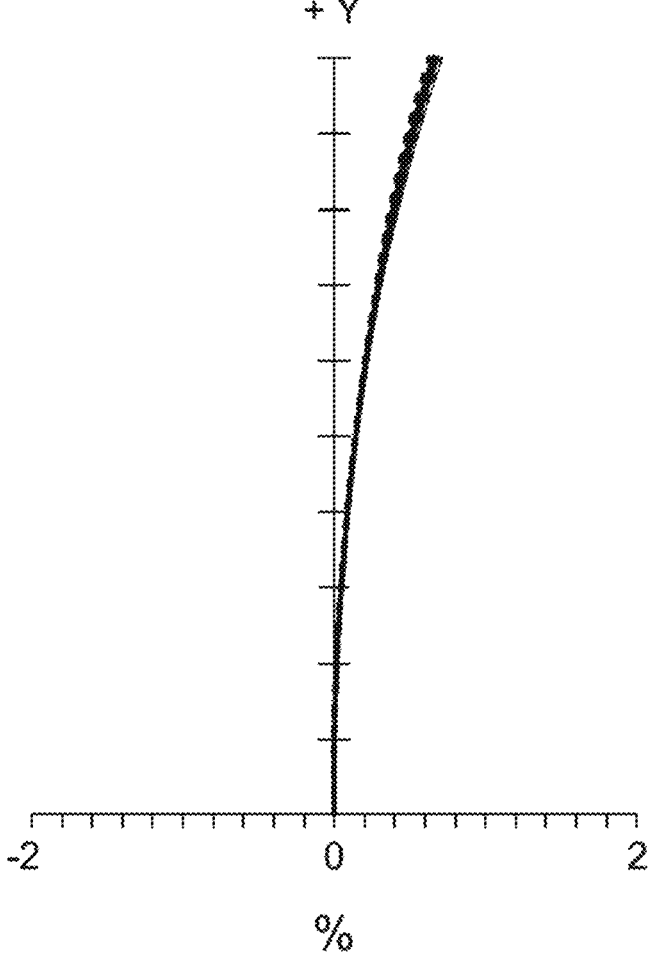
Figure 4:
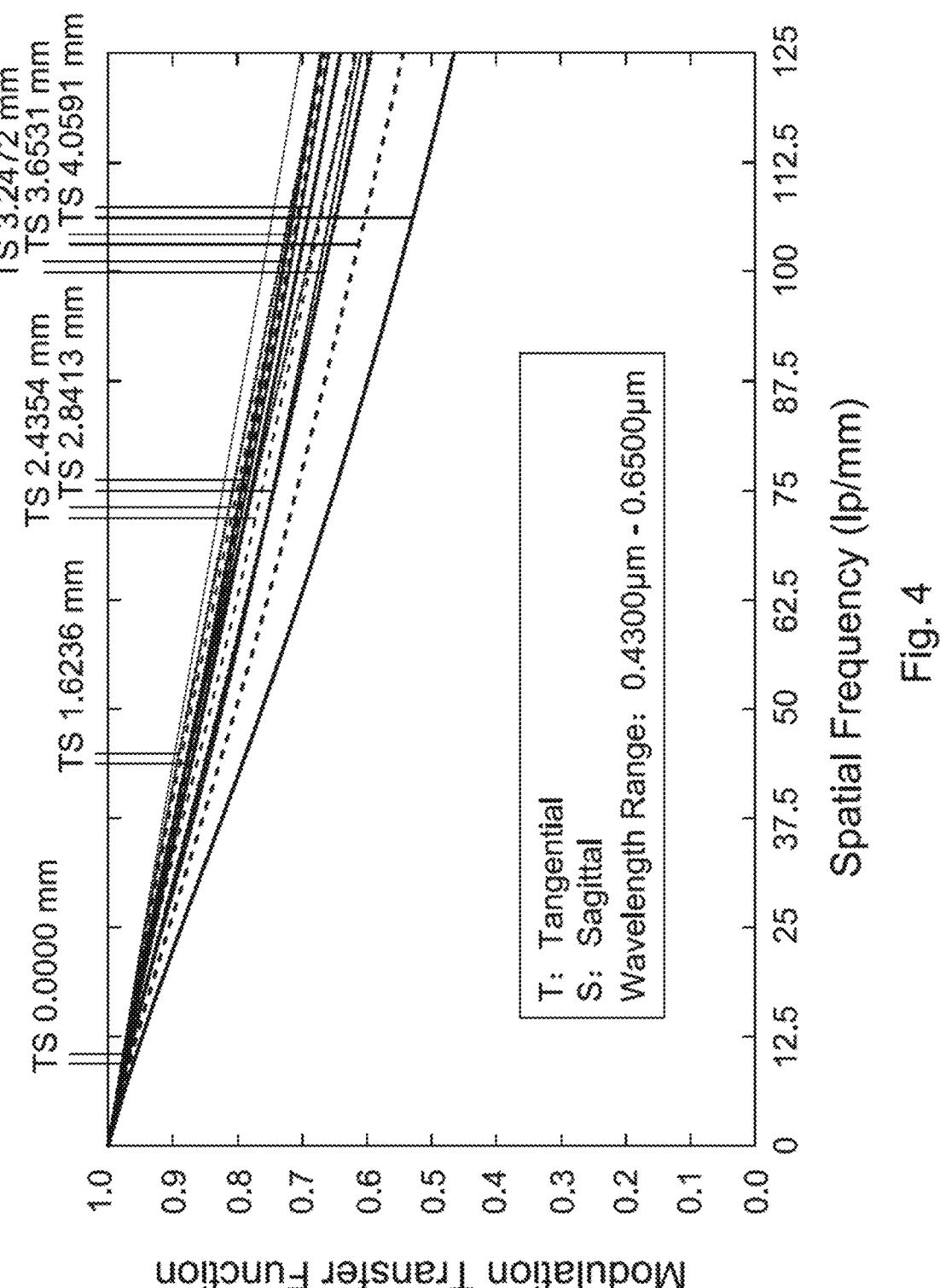
FIG. 4 depict a modulation transfer function diagram of the lens assembly in accordance with the first embodiment of the invention.

In addition, the lens assembly 1 of the first embodiment can meet the requirements of optical performance as seen in FIGS. 2-4. It can be seen from FIG. 2 that the field curvature of tangential direction and sagittal direction in the lens assembly 1 of the first embodiment ranges from −0.05 mm to 0.04 mm. It can be seen from FIG. 3 that the distortion in the lens assembly 1 of the first embodiment ranges from 0% to 0.8%. It can be seen from FIG. 4 that the modulation transfer function of tangential direction and sagittal direction in the lens assembly 1 of the first embodiment ranges from 0.47 to 1.0. It is obvious that the field curvature and the distortion of the lens assembly 1 of the first embodiment can be corrected effectively, the image resolution can meet the requirements. Therefore, the lens assembly 1 of the first embodiment is capable of good optical performance. The preferred embodiment of the present invention can be achieved when the lens assembly 1 meets the refractive power distribution and surface shape in Table 1 and Table 2, and satisfies conditions (1)-(16).

A detailed description of a lens assembly in accordance with a second embodiment of the invention is as follows. Referring to FIG. 5, the lens assembly 2 includes a stop ST2, a first lens L21, a second lens L22, a third lens L23, a first reflective element P21, a second reflective element P22, and an optical filter OF2. The stop ST2, the first lens L21, the second lens L22, the third lens L23 and the first reflective element P21 are arranged in order from an object side along a first axis AX21. The first reflective element P21 and the second reflective element P22 are arranged in order along a second axis AX22. An image plan IMA2, the optical filter OF2 and the second reflective element P22 are arranged in order from an image side along a third axis AX23. The first axis AX21 and the second axis AX22 intersect perpendicularly at a point, the second axis AX22 and the third axis AX23 do not intersect perpendicularly at another point, and the extension lines of the first axis AX21 and the third axis AX23 do not perpendicularly intersect at yet another point. The first reflective element P21 includes a first surface S28, a second surface S29, and a third surface S210, the first surface S28 and the third lens L23 are opposed to each other, both sides of the first surface S28 are respectively connected to one side of the second surface S29 and one side of the third surface S210, and the other side of the second surface S29 is connected to the other side of the third surface S210. The second reflective element P22 includes a fourth surface S211, a fifth surface S212, a sixth surface S213, and a groove G2, the fourth surface S211 and the third surface S210 opposed to each other, one side of the fifth surface S212 is connected to one side of the fourth surface S211, the other side of the fifth surface S212 is connected to one side of the sixth surface S213, and the sixth surface S213 faces an image plane IMA2. The groove G2 is disposed on the other side opposite to the fifth surface S212, and the recessed area of the groove G2 faces away from the fifth surface S212. The third surface S210 of the first reflective element P21 and the fourth surface S211 of the second reflective element P22 are cemented. However, the invention is not limited thereto, the groove G2 can be disposed at any place on the first reflective element P21 or the second reflective element P22 as required to achieve the effect of eliminating stray light and preventing flare. In addition, the third surface S210 of the first reflective element P21 and the fourth surface S211 of the second reflective element P22 can be not glued together but have an air gap. In operation, a light from the object side passing through the stop ST2, the first lens L21, the second lens L22 and the third lens L23, and then entering the first reflective element P21 from the first surface S28, then guided to the second surface S29, reflected by the second surface S29 and guided to the first surface S28, then reflected by the first surface S28 and guided to the third surface S210, then exiting the first reflective element P21 from the third surface S210, and then enters the second reflective element P22 from the fourth surface S211, and then emits to the fifth surface S212, and is reflected by the fifth surface S212 to the sixth surface S213, finally exiting the second reflective element P22 from the sixth surface S213. The light is reflected two times inside the first reflective element P21, and reflected one time inside the second reflective element P22, finally imaged on an image plane IMA2. The above mentioned groove G2 can effectively eliminate ghosts, flare and stray light. According to the foregoing, wherein: the second lens L22 is with negative refractive power; the third lens L23 is meniscus lens with positive refractive power, wherein the object side surface S26 is a convex surface; and both of the object side surface S214 and image side surface S215 of the optical filter OF2 are plane surfaces. With the above design of the lenses, stop ST2, first reflective element P21, second reflective element P22, and at least one of the conditions (1)-(13) satisfied, the lens assembly 2 can have an effective shortened total lens length, an effective decreased volume, an effective increased resolution, and an effective corrected aberration.

Table 4 shows the optical specification of the lens assembly 2 in FIG. 5.

TABLE 4

Effective Focal Length = 16.7 mm F-number = 2.8
Total Lens Length = 20.68 mm Field of View = 27 degrees

| Surface Number | Radius of Curvature (mm) | Thick- ness (mm) | Nd | Vd | Effective Focal Length (mm) | Remark |
|---|---|---|---|---|---|---|
| S21 | ∞ | −1.228 | | | | ST2 |
| S22 | 4.90 | 1.17 | 1.85 | 40.3 | 10.192 | L21 |
| S23 | 10.01 | 0.02 | | | | |
| S24 | 3.01 | 0.58 | 2 | 19.43 | −9.708 | L22 |
| S25 | 2.07 | 0.54 | | | | |
| S26 | 5.35 | 0.46 | 1.53 | 56.11 | 19.499 | L23 |
| S27 | 10.63 | 1.13 | | | | |
| S28 | ∞ | 7.64 | 1.62 | 63.1 | | P21 |
| S210 | ∞ | 0.00 | | | | |
| S211 | ∞ | 7.00 | 1.62 | 63.1 | | P22 |
| S213 | ∞ | 0.30 | | | | |
| S214 | ∞ | 0.21 | 1.52 | 61.2 | | OF2 |
| S215 | ∞ | 1.63 | | | | |

The definition of aspheric surface sag z of each aspheric lens in table 4 is the same as that of in Table 1, and is not described here again. In the second embodiment, the conic constant k and the aspheric coefficients A, B, C, D, E, F, G of each aspheric lens are shown in Table 5.

TABLE 5

| Surface Number | k | A E | B F | C G | D |
|---|---|---|---|---|---|
| S22 | −1.28E+00 | 4.27E−03 −2.46E−07 | −6.82E−04 2.49E−09 | 2.56E−04 0.00E+00 | −5.01E−05 |
| S23 | −1.31E+02 | 9.93E−03 2.77E−05 | 9.17E−04 −3.96E−06 | −5.11E−04 1.71E−07 | −1.35E−05 |
| S24 | 2.89E−02 | −2.94E−02 5.27E−05 | 1.20E−02 −1.10E−05 | −3.24E−03 5.64E−07 | 2.40E−04 |
| S25 | −4.25E+00 | 1.86E−02 6.26E−04 | −3.02E−03 −8.70E−05 | 3.17E−03 4.54E−06 | −2.07E−03 |
| S26 | 1.71E+00 | −1.33E−03 −3.41E−04 | 4.81E−03 6.74E−05 | −1.98E−03 −5.25E−06 | 9.07E−04 |
| S27 | −2.11E+02 | 3.00E−02 1.10E−03 | −1.90E−02 −1.28E−04 | 1.25E−02 5.87E−06 | −4.92E−03 |

Table 6 shows the parameters and condition values for conditions (1)-(13) in accordance with the second embodiment of the invention. It can be seen from Table 6 that the lens assembly 2 of the second embodiment satisfies the conditions (1)-(13).

TABLE 6

| | |
|---|---|
| D1IMG | 5.56 mm |
| f × (T1 + T2 + T3) | 36.9 mm$^2$ |
| TTL/T2 | 35.36 |
| D1IMG × f1 | 56.67 mm$^2$ |
| Vd2 − VdP2 | −43.67 |
| DisL1toP | 3.91 mm |
| f1 × T2 | 5.96 mm$^2$ |
| f1/T1 | 8.71 |
| DisLltoP × f1 | 39.85 mm$^2$ |
| f1 + f2 | 0.48 mm |
| f1/f3 | 0.52 |
| TTL/(T1 + T2 + T3) | 9.35 |
| (f + TTL)/f1 | 3.67 |
| Vd1 − VdP1 | −22.83 |
| f2 + f3 | 9.79 mm |

The above mentioned lens assembly 2 can also be modified to only satisfies any one of conditions (1)-(13), and satisfies the first lens is with positive refractive power, the second lens is with refractive power, the third lens is with refractive power, the first lens includes a concave surface facing the image side, the first reflective element includes a first surface, a second surface and a third surface, and the second reflective element includes a fourth surface, a fifth surface and a sixth surface, without other additional conditions and features, the basic operation of the lens assembly 2 of the present invention can be achieved.

Figure 6:
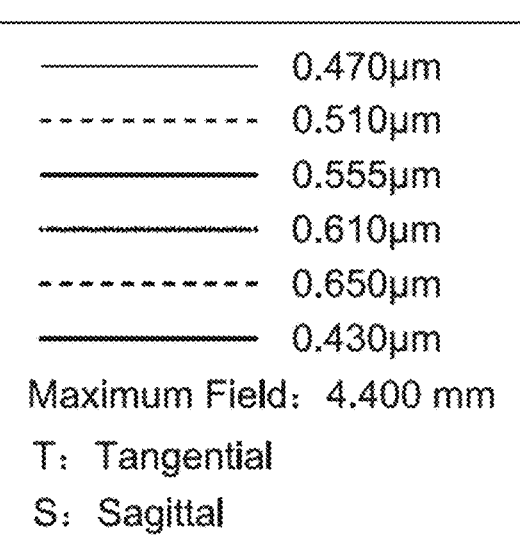
FIG. 6 depict a field curvature diagram of the lens assembly in accordance with the second embodiment of the invention.
Figure 6:
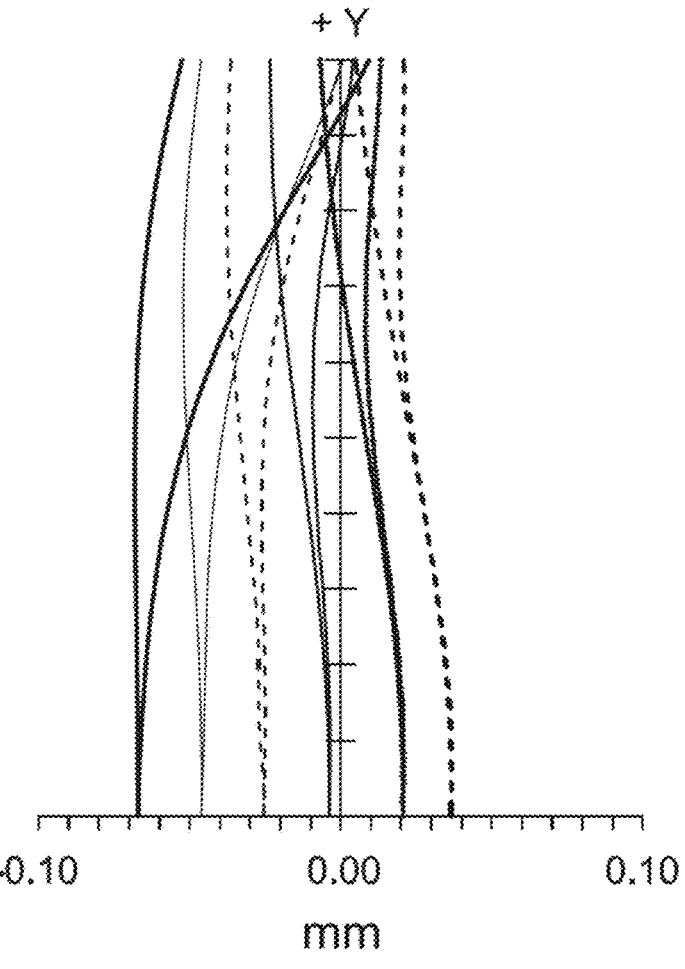
Figure 7:
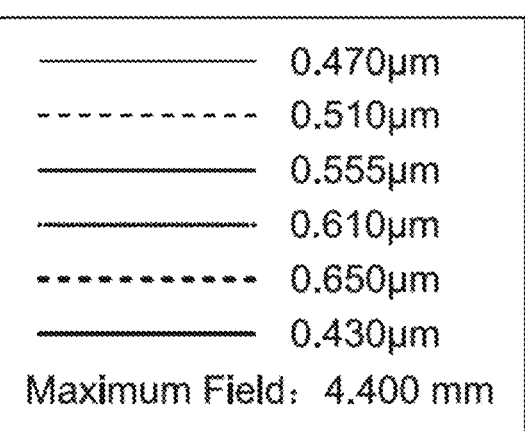
FIG. 7 depict a distortion diagram of the lens assembly in accordance with the second embodiment of the invention.
Figure 7:
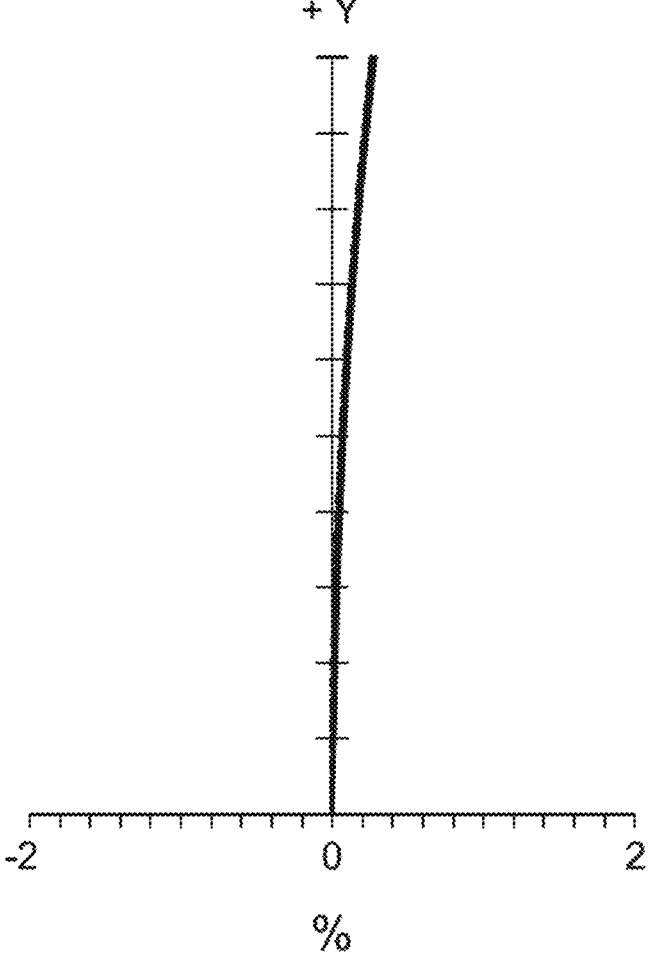
Figure 8:
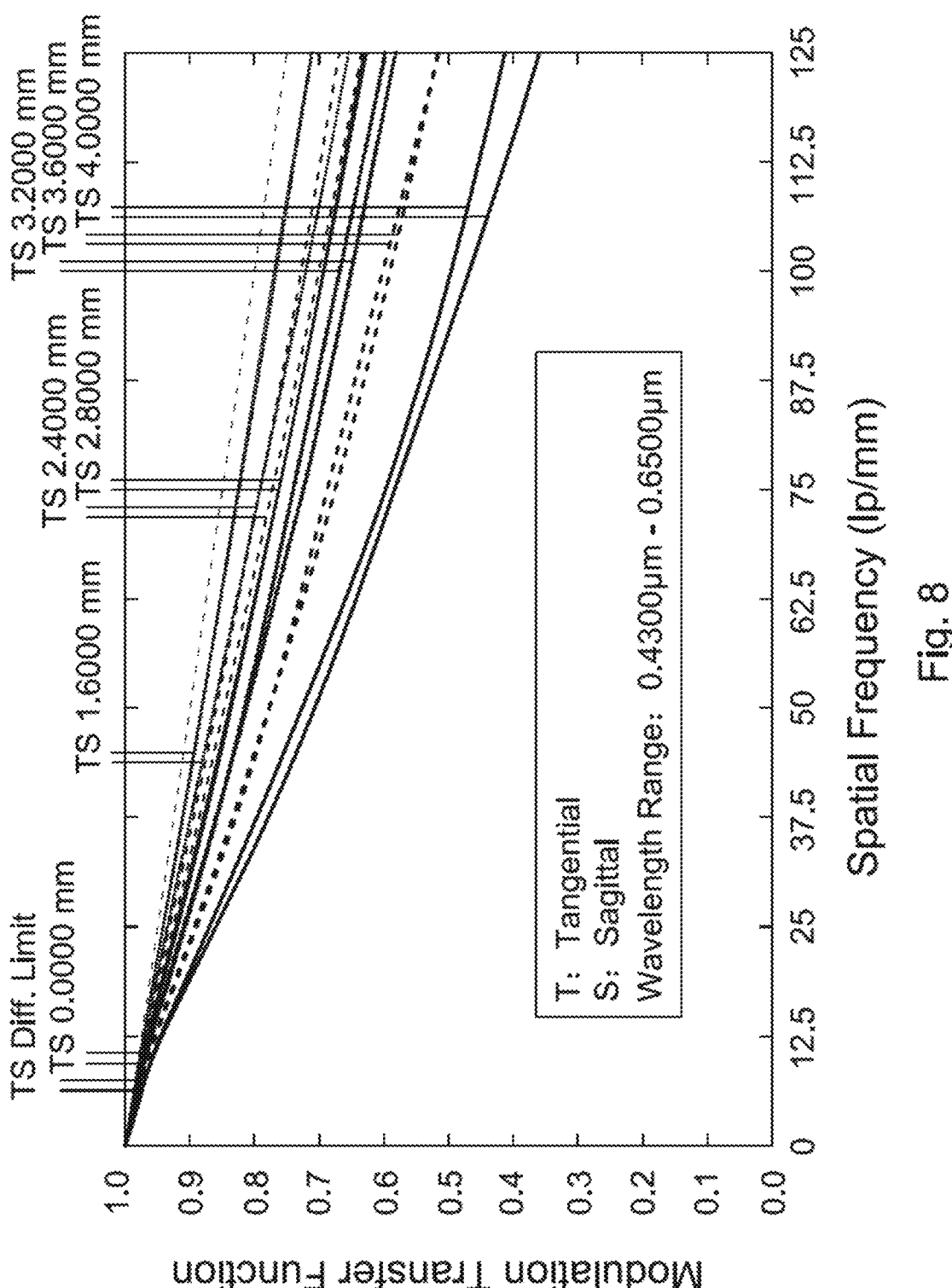
FIG. 8 depict a modulation transfer function diagram of the lens assembly in accordance with the second embodiment of the invention.

In addition, the lens assembly 2 of the second embodiment can meet the requirements of optical performance as seen in FIGS. 6-8. It can be seen from FIG. 6 that the field curvature of tangential direction and sagittal direction in the lens assembly 2 of the second embodiment ranges from −0.07 mm to 0.04 mm. It can be seen from FIG. 7 that the distortion in the lens assembly 2 of the second embodiment ranges from 0% to 0.4%. It can be seen from FIG. 8 that the modulation transfer function of tangential direction and sagittal direction in the lens assembly 2 of the second embodiment ranges from 0.37 to 1.0. It is obvious that the field curvature and the distortion of the lens assembly 2 of the second embodiment can be corrected effectively, the image resolution can meet the requirements. Therefore, the lens assembly 2 of the second embodiment is capable of good optical performance. The preferred embodiment of the present invention can be achieved when the lens assembly 2 meets the refractive power distribution and surface shape in Table 4 and Table 5, and satisfies conditions (1)-(13).

A detailed description of a lens assembly in accordance with a third embodiment of the invention is as follows. Referring to FIG. 9, the lens assembly 3 includes a stop ST3, a first lens L31, a second lens L32, a third lens L33, a first reflective element P31, a second reflective element P32, and an optical filter OF3. The stop ST3, the first lens L31, the second lens L32, the third lens L33 and the first reflective element P31 are arranged in order from an object side along a first axis AX31. The first reflective element P31 and the second reflective element P32 are arranged in order along a second axis AX32. An image plan IMA3, the optical filter OF3 and the second reflective element P32 are arranged in order from an image side along a third axis AX33. The first axis AX31 and the second axis AX32 intersect perpendicularly at a point, the second axis AX32 and the third axis AX33 do not intersect perpendicularly at another point, and the extension lines of the first axis AX31 and the third axis AX33 do not perpendicularly intersect at yet another point. The first reflective element P31 includes a first surface S38, a second surface S39, and a third surface S310, the first surface S38 and the third lens L33 are opposed to each other, both sides of the first surface S38 are respectively connected to one side of the second surface S39 and one side of the third surface S310, and the other side of the second surface S39 is connected to the other side of the third surface S310. The second reflective element P32 includes a fourth surface S311, a fifth surface S312, a sixth surface S313, and a groove G3, the fourth surface S311 and the third surface S310 opposed to each other, one side of the fifth surface S312 is connected to one side of the fourth surface S311, the other side of the fifth surface S312 is connected to one side of the sixth surface S313, and the sixth surface S313 faces an image plane IMA3. The groove G3 is disposed on the other side opposite to the fifth surface S312, and the recessed area of the groove G3 faces away from the fifth surface S312. The third surface S310 of the first reflective element P31 and the fourth surface S311 of the second reflective element P32 are cemented. However, the invention is not limited thereto, the groove G3 can be disposed at any place on the first reflective element P31 or the second reflective element P32 as required to achieve the effect of eliminating stray light and preventing flare. In addition, the third surface S310 of the first reflective element P31 and the fourth surface S311 of the second reflective element P32 can be not glued together but have an air gap. In operation, a light from the object side passing through the stop ST3, the first lens L31, the second lens L32 and the third lens L33, and then entering the first reflective element P31 from the first surface S38, then guided to the second surface S39, reflected by the second surface S39 and guided to the first surface S38, then reflected by the first surface S38 and guided to the third surface S310, then exiting the first reflective element P31 from the third surface S310, and then enters the second reflective element P32 from the fourth surface S311, and then emits to the fifth surface S312, and is reflected by the fifth surface S312 to the sixth surface S313, finally exiting the second reflective element P32 from the sixth surface S313. The light is reflected two times inside the first reflective element P31, and reflected one time inside the second reflective element P32, finally imaged on an image plane IMA3. The above mentioned groove G3 can effectively eliminate ghosts, flare and stray light. According to the foregoing, wherein: the second lens L32 is with positive refractive power; the third lens L33 is biconcave lens with negative refractive power, wherein the object side surface S36 is a concave surface; and both of the object side surface S314 and image side surface S315 of the optical filter OF3 are plane surfaces. With the above design of the lenses, stop ST3, first reflective element P31, second reflective element P32, and at least one of the conditions (1)-(16) satisfied, the lens assembly 3 can have an effective shortened total lens length, an effective decreased volume, an effective increased resolution, and an effective corrected aberration.

Table 7 shows the optical specification of the lens assembly 3 in FIG. 9.

TABLE 7

Effective Focal Length = 16.8 mm F-number = 2.28
Total Lens Length = 20.722 mm Field of View = 27.1 degrees

| Surface Number | Radius of Curvature (mm) | Thickness (mm) | Nd | Vd | Effective Focal Length (mm) | Remark |
|---|---|---|---|---|---|---|
| S31 | ∞ | −1.073 | | | | ST3 |
| S32 | 6.88 | 0.94 | 1.88 | 39.2 | 9.33 | L31 |
| S33 | 38.16 | 0.02 | | | | |
| S34 | 5.31 | 0.82 | 1.88 | 39.2 | 145.68 | L32 |
| S35 | 5.14 | 0.29 | | | | |
| S36 | −10.38 | 0.40 | 1.67 | 19.20 | −12.56 | L33 |
| S37 | 47.92 | 1.90 | | | | |
| S38 | ∞ | 7.50 | 1.52 | 64.2 | | P31 |
| S310 | ∞ | 0.00 | | | | |
| S311 | ∞ | 8.00 | 1.52 | 64.2 | | P32 |
| S313 | ∞ | 0.30 | | | | |
| S314 | ∞ | 0.21 | 1.52 | 61.2 | | OF3 |
| S315 | ∞ | 0.34 | | | | |

The definition of aspheric surface sag z of each aspheric lens in table 7 is the same as that of in Table 1, and is not described here again. In the third embodiment, the conic constant k and the aspheric coefficients A, B, C, D, E, F, G of each aspheric lens are shown in Table 8.

TABLE 8

| Surface Number | k | A E | B F | C G | D |
|---|---|---|---|---|---|
| S32 | −1.97E−02 | −7.99E−04 | 1.67E−04 | −1.34E−05 | 2.35E−06 |
| | | 1.71E−08 | −5.11E−10 | 0.00E+00 | |
| S33 | −2.35E+02 | 1.75E−03 | 2.00E−04 | −1.15E−05 | −9.32E−07 |
| | | 2.22E−07 | −1.90E−08 | 4.84E−10 | |
| S34 | 1.21E+00 | 3.24E−05 | −2.32E−04 | −1.21E−05 | 9.95E−07 |
| | | 2.05E−07 | −2.44E−08 | 6.29E−10 | |
| S35 | 1.05E+00 | −4.90E−03 | −5.58E−04 | 2.98E−05 | 5.23E−06 |
| | | −1.38E−07 | −5.25E−08 | 3.04E−09 | |
| S36 | −3.49E+01 | 1.97E−02 | −1.25E−03 | −8.10E−05 | 9.65E−06 |
| | | 8.26E−07 | −1.36E−07 | 4.47E−09 | |
| S37 | 3.01E+02 | 2.77E−02 | −1.25E−03 | 1.36E−04 | −4.65E−05 |
| | | 3.10E−06 | 2.61E−07 | −2.84E−08 | |

Table 9 shows the parameters and condition values for conditions (1)-(16) in accordance with the third embodiment of the invention. It can be seen from Table 9 that the lens assembly 3 of the third embodiment satisfies the conditions (1)-(16).

TABLE 9

| | |
|---|---|
| D1IMG | 7.2 mm |
| f × (T1 + T2 + T3) | 36.25 mm$^2$ |
| TTL/T2 | 25.33 |
| D1IMG × f1 | 67.18 mm$^2$ |
| f/T1 | 17.82 |
| Vd2 − VdP2 | −25 |
| DisLItoP | 4.37 mm |
| f1 × T2 | 7.63 mm$^2$ |
| f1/T1 | 9.90 |
| DisL1toP × f1 | 40.77 mm$^2$ |
| (R11 + R12)/T1 | 47.79 |
| f1 + f2 | 155.01 mm |
| f1/f3 | −0.74 |
| TTL/(T1 + T2 + T3) | 9.60 |
| (f + TTL)/f1 | 4.02 |
| f1 × R12 | 356.03 mm$^2$ |
| Vd1 − VdP1 | −25 |
| f2 + f3 | 133.12 mm |

The above mentioned lens assembly 3 can also be modified to only satisfies any one of conditions (1)-(16), and satisfies the first lens is with positive refractive power, the second lens is with refractive power, the third lens is with refractive power, the first lens includes a concave surface facing the image side, the first reflective element includes a first surface, a second surface and a third surface, and the second reflective element includes a fourth surface, a fifth surface and a sixth surface, without other additional conditions and features, the basic operation of the lens assembly 3 of the present invention can be achieved.

It is obvious that the field curvature (diagram is omitted) and the distortion (diagram is omitted) of the lens assembly 3 of the third embodiment can be corrected effectively, the image resolution can meet the requirements. Therefore, the lens assembly 3 of the third embodiment is capable of good optical performance. The preferred embodiment of the present invention can be achieved when the lens assembly 3 meets the refractive power distribution and surface shape in Table 7 and Table 8, and satisfies conditions (1)-(16).

In the above embodiments, the lens assembly 1, 2, 3 include three lenses which with refractive power. However, the invention is not limited thereto, the lens assembly 1, 2, 3 can further include a fourth lens, a fifth lens . . . etc. Alternatively, the lens assembly 1, 2, 3 can be modified to include only two or one lens, in other words, the lens assembly may include at least one or more lenses.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:

a first lens which is with positive refractive power;

a second lens which is with refractive power;

a third lens which is with refractive power;

a first reflective element; and a second reflective element;

wherein the first reflective element comprises a first surface, a second surface, and a third surface, and the first surface and the third lens are opposed to each other;

wherein the second reflective element comprises a fourth surface, a fifth surface, and a sixth surface, and the fourth surface and the third surface opposed to each other;

wherein the first lens, the second lens, the third lens, and the first reflective element are arranged in order from an object side along a first axis;

wherein the first reflective element and the second reflective element are arranged in order along a second axis;

wherein the second reflective element and an image plane are arranged in order along a third axis;

wherein the first axis and the second axis intersect perpendicularly at a point, the second axis and the third axis do not intersect perpendicularly at another point, and the extension lines of the first axis and the third axis do not perpendicularly intersect at yet another point;

wherein the first lens comprises a concave surface facing the first surface;

wherein the lens assembly satisfies at least one of following conditions:

$$34 \text{ mm}^2 < f \times (T1 + T2 + T3) < 44 \text{ mm}^2;$$

$$9 < TTL/(T1 + T2 + T3) < 10;$$

$$9.5 < f1/T1 < 39.5;$$

$$1.2 < (f + TTL)/f1 < 4.1;$$

$$55 \text{ mm}^2 < D1IMG \times f1 < 158 \text{ mm}^2;$$

$$17 < f/T1 < 30;$$

$$44 < (R11 + R12)/T1 < 63;$$

wherein f is an effective focal length of the lens assembly, f1 is an effective focal length of the first lens, T1 is an interval from an object side surface of the first lens to an image side surface of the first lens along the first axis, T2 is an interval from an object side surface of the second lens to an image side surface of the second lens along the first axis, T3 is an interval from an object side surface of the third lens to an image side surface of the third lens along the first axis, TTL is an interval from the object side surface of the first lens to the image plane along the first axis, the second axis and the third axis respectively, D1IMG is an optical effective diameter of the image side surface of the first lens, R11 is a radius of curvature of the object side surface of the first lens, and R12 is a radius of curvature of the image side surface of the first lens.

2. The lens assembly as claimed in claim 1, wherein the first lens is a meniscus lens and further comprises a convex surface facing the object side.

3. The lens assembly as claimed in claim 2, wherein the second lens is a meniscus lens and comprises a convex surface facing the object side and a concave surface facing the first surface.

4. The lens assembly as claimed in claim 3, wherein the third lens comprises a concave surface facing the first surface.

5. The lens assembly as claimed in claim 4, wherein:

the second lens is with positive refractive power; and the third lens is a meniscus lens.

6. The lens assembly as claimed in claim 5, wherein the third lens is with negative refractive power and further comprises a convex surface facing the object side.

7. The lens assembly as claimed in claim 4, wherein:

the second lens is with negative refractive power; and the third lens is with positive refractive power.

8. The lens assembly as claimed in claim 7, wherein the third lens is a meniscus lens and further comprises a convex surface facing the object side.

9. The lens assembly as claimed in claim 4, wherein the second lens is with positive refractive power.

10. The lens assembly as claimed in claim 9, wherein the third lens is a biconcave lens with negative refractive power and further comprises another concave surface facing the object side.

11. The lens assembly as claimed in claim 2, wherein the lens assembly satisfies at least one of the following conditions:

$$300 \text{ mm}^2 < f1 \times R12 < 800 \text{ mm}^2;$$

$$5 \text{ mm}^2 < f1 \times T2 < 24 \text{ mm}^2;$$

$$24.5 < TTL/T2 < 35.5;$$

$$37 \text{ mm}^2 < DisL1toP \times f1 < 119 \text{ mm}^2;$$

wherein f1 is the effective focal length of the first lens, T2 is the interval from the object side surface of the second lens to the image side surface of the second lens along the first axis, TTL is the interval from the object side surface of the first lens to the image plane along the first axis, the second axis and the third axis respectively, DisL1toP is an interval from the object side surface of the first lens to the first surface of the first reflective element along the first axis, and R12 is the radius of curvature of the image side surface of the first lens.

12. The lens assembly as claimed in claim 1, wherein both sides of the first surface are respectively connected to one side of the second surface and one side of the third surface, and the other side of the second surface is connected to the other side of the third surface.

13. The lens assembly as claimed in claim 12, wherein one side of the fifth surface is connected to one side of the fourth surface, the other side of the fifth surface is connected to one side of the sixth surface, and the sixth surface faces the image plane.

14. The lens assembly as claimed in claim 1, wherein a light from the object side enters the first reflective element from the first surface and guide to the second surface, and the light be reflected at least two times inside the first reflective element, then exit the first reflective element form the third surface.

15. The lens assembly as claimed in claim 14, wherein the light from the first reflective element is incident in the second reflective element from the fourth surface, and then emitted to the fifth surface, the light is reflected at least once inside the second reflective element, and finally emitted from the sixth surface of the second reflective element.

16. The lens assembly as claimed in claim 1, further comprising a stop disposed between the object side and the first lens, wherein the first reflective element and the second reflective element are cemented.

17. The lens assembly as claimed in claim 1, further comprising a groove disposed on the first reflective element or the second reflective element.

18. The lens assembly as claimed in claim 17, wherein the groove is disposed on the other side opposite to the fifth surface, and the recessed area of the groove faces away from the fifth surface.

19. The lens assembly as claimed in claim 1, wherein the lens assembly satisfies at least one of following conditions:

$$-35 \le Vd1 - VdP1 \le 10;$$
$$-55 \le Vd2 - VdP2 \le 0;$$

wherein Vd1 is an Abbe number of the first lens, Vd2 is an Abbe number of the second lens, VdP1 is an Abbe number of the first reflective element, and VdP2 is an Abbe number of the second reflective element.

20. The lens assembly as claimed in claim 1 wherein the lens assembly satisfies at least one of following conditions:

$$0 \text{ mm} \le f1 + f2 \le 200 \text{ mm};$$
$$0 \text{ mm} \le f2 + f3 \le 180 \text{ mm};$$
$$-5 \le f1/f3 \le 4;$$

wherein f1 is an effective focal length of the first lens, f2 is an effective focal length of the second lens, and f3 is an effective focal length of the third lens.

\* \* \* \* \*